United States Patent [19]

Sakanishi

[11] Patent Number: 5,171,962
[45] Date of Patent: Dec. 15, 1992

[54] METHOD OF MANUFACTURING LAMINATED CORE

[75] Inventor: Shinichi Sakanishi, Kawasaki, Japan

[73] Assignee: Kuroda Seiko Company Limited, Kawasaki, Japan

[21] Appl. No.: 661,927

[22] Filed: Feb. 28, 1991

[30] Foreign Application Priority Data

Feb. 28, 1990 [JP] Japan .................................. 2-48825
Jun. 26, 1990 [JP] Japan .................................. 2-167547
Aug. 22, 1990 [JP] Japan .................................. 2-222218

[51] Int. Cl.$^5$ ............................................. B23K 26/00
[52] U.S. Cl. ............................ 219/121.64; 219/121.77
[58] Field of Search ...................... 219/121.63, 121.64, 219/121.77

[56] References Cited

U.S. PATENT DOCUMENTS 5,053,601 10/1991 Landtwing et al. ........ 219/121.64 X

FOREIGN PATENT DOCUMENTS

| 51-53204 | 5/1976 | Japan . | |
|---|---|---|---|
| 0011140 | 2/1978 | Japan | 219/121.64 |
| 0036962 | 3/1980 | Japan | 219/121.64 |
| 0193793 | 8/1986 | Japan | 219/121.64 |
| 62-14087 | 3/1987 | Japan . | |

Primary Examiner—C. L. Albritton
Attorney, Agent, or Firm—Varndell Legal Group

[57] ABSTRACT

In a method of manufacturing a laminated magnetic core by laser welding successive core sheets, the core sheets are stacked one on another to form a stacked body of core sheets, and while the stacked body of core sheets is moved in a stepwise manner in a thickness direction perpendicular to a surface of the core sheet with respect to at least one optical fiber exit unit from which a laser beam is projected onto an outer surface of the stacked body of core sheets, the laser beam is intermittently projected onto the stacked body of core sheets such that at least successive three core sheets are welded together, and then the stacked body of core sheets is moved in the thickness direction over a distance substantially equal to at least a twice of the thickness of core sheets. When a plurality of optical fiber exit units are provided such that they are separated in a surface direction perpendicular to the thickness direction, a plurality of laser beams are projected simultaneously or alernately each time the stacked body of core sheets is moved in the thickness direction over a distance substantially equal to at least the thickness of core sheets. In this manner according to the invention, it is possible to obtain welded areas which are separated in the thickness direction and/or in the surface direction.

8 Claims, 6 Drawing Sheets

METHOD OF MANUFACTURING LAMINATED CORE

BACKGROUND OF THE INVENTION

Field of the Invention and Related Art Statement

The present invention relates to a method of manufacturing a laminated core such as magnetic core and electric motor core, in which a number of thin core sheets made of silicon steel such as permalloy and amorphous and having a thickness smaller than 0.1 mm are stacked one on another to obtain a stacked body of core sheets and then the core sheets of the stacked body are coupled with one another.

In case of manufacturing such a laminated core, it has been known to connect thin core sheets of a stacked body with the aid of a laser beam welding. In a known welding method using the laser beam, a laser beam is continuously projected onto an outer surface of the stacked body of core sheets, so that a welding is effected continuously. It has been known that when the core sheets are coupled with one another such that a continuously welded area is formed on the outer surface of the stacked body, the influence of heat upon portions surroundings the welded area becomes large and the efficiency of a magnetic circuit including the laminated core thus formed is reduced due to the increase in the magnetic resistance, hysteresis loss and iron loss owing to the eddy current. In order to mitigate such a drawback, in Japanese Patent Publication No. 62-14087, it has been proposed another known method of manufacturing the laminated core. In this known method, the laser beam is projected intermittently on the outer surface of the stacked body of core sheets selectively at boundaries of successive core sheets. This method is effective only when the core sheets have a sufficiently large thickness as compared with a size of a laser beam spot on the stacked body, but could not be effectively applied to the manufacture of a laminated core such as a magnetic core in which silicon steel sheets or plates having a very small thickness are stacked one on another. For instance, the silicon steel plates made of permalloy for use in the magnetic core have the thickness smaller than 0.1 mm and the amorphous silicon steel sheets have the thickness usually smaller than 0.03 mm. Therefore, even if the laser beam spot is made incident upon the boundaries of successive core sheets having a very small thickness, successive welded areas are coupled with one another, and thus it is practically impossible to obtain the discontinuously welded areas.

Theoretically it is possible to obtain a fine laser beam spot by using a lens, but in practice, the laser beam is projected upon the stacked body of core sheets by means of an optical fiber, so that the size of the laser beam spot is limited by the diameter of the optical fiber and could not be made smaller than 0.2 mm. In this manner, in the known method of manufacturing the laminated core, when the thickness of the core sheets is very small, it is difficult to obtain the discrete welded areas even if the laser beam is projected onto the stacked body of core sheets intermittently.

Furthermore, in the known method, in order to separate blocks having any desired length, it is necessary to reduce the diameter of the laser beam spot smaller than a twice of the thickness of the core sheets. This results in that the known method could not be effectively applied to the laminated core such as the magnetic core formed by very thin core sheets.

SUMMARY OF THE INVENTION

The present invention has for its object to provide a novel and useful method of manufacturing a laminated core formed by very thin core sheets having a thickness smaller than 0.1 mm by means of the spot welding using the laser beam, so that the efficiency of the manufactured laminated core can be increased.

According to the invention, a method of manufacturing a laminated core comprises the steps of:

stacking a plurality of core sheets one on another to form a stacked body of core sheets; and projecting a laser beam onto an outer surface of the stacked body of core sheets intermittently each time the laser beam and the stacked body of core sheets are moved relative to each other in a thickness direction perpendicular to surfaces of the core sheets over a distance substantially equal to at least a twice of a thickness of core sheets such that at least two successive core sheets are welded with each other by a single projection of the laser beam.

In a preferable embodiment of the method according to the invention, the stacked body of core sheets is moved in the thickness direction perpendicular to the plane of the core sheets with respect to an exit end of an optical fiber projecting the laser beam, and the laser beam is emitted each time the stacked body of core sheets is moved over a distance substantially equal to a plural times of the thickness of the core sheets. For instance, when the stacked body of core sheets is moved over a distance equal to a twice of the thickness of core sheets and successive three core sheets are coupled with each other simultaneously by a single projection of the laser beam, a distance between successive welded areas viewed in the thickness direction amounts to about the thickness of the core sheets so that the welded areas are not connected to each other.

In another embodiment of the method according to the invention, first and second optical fibers are arranged such that their exit ends situate on the same plane viewed in the thickness direction, but are separated from each other viewed in a surface direction perpendicular to the thickness direction, and the laser beams are emitted from the exit ends of said first and second optical fibers alternately each time the stacked body of core sheets is moved in the thickness direction over a distance equal to a twice of the thickness of the core sheets. In this embodiments, successive welded areas are separated in the surface direction, so that a distance between welded areas successively aligned in the thickness direction amounts to a four times of the thickness of the core sheets.

In still another embodiment of the method according to the invention, first, second, third and fourth optical fibers are arranged such that exit ends of the first and second optical fibers situate on the same first plane viewed in the thickness direction, but are separated from each other viewed in the surface direction, and exits ends of the third and fourth optical fibers situate on the same second plane which is shifted in the thickness direction by a distance equal to the thickness of the core sheets, but are separated from each other viewed in the surface direction. After the laser beams have been simultaneously projected from the exit ends of the first and second optical fibers, the stacked body of core sheets is moved in the thickness direction over a distance equal to a twice of the thickness of the core sheets, and then the laser beams are simultaneously emitted from the exit ends of the third and fourth optical fibers.

DESCRIPTION OF THE PREFERRED EMBODIMENTS

Figure 1:
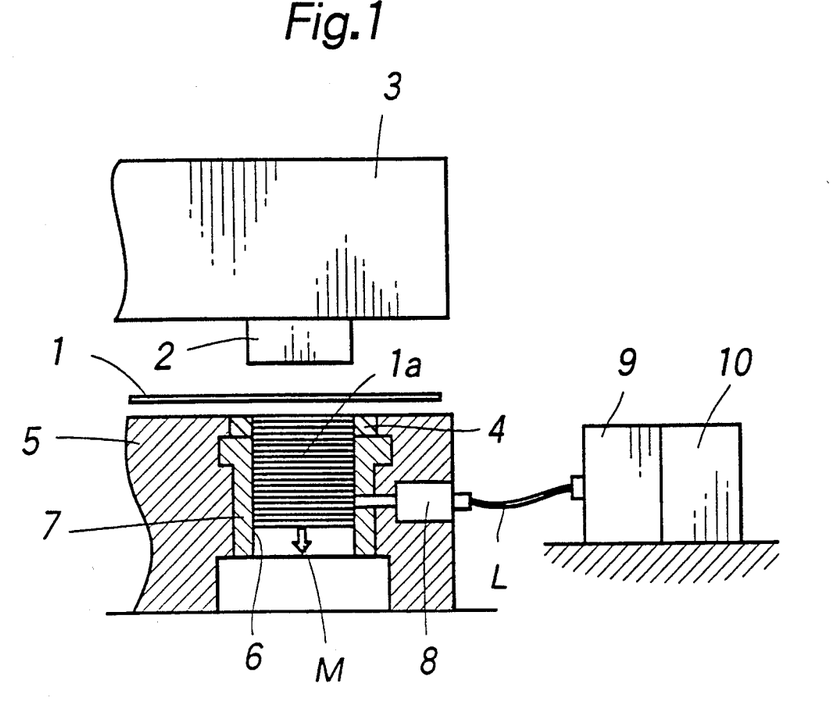
FIG. 1 is a partially cross sectional view showing an apparatus for carrying out an embodiment of the laminated core manufacturing method according to the invention.

FIG. 1 is a partially cross sectional view showing an apparatus for carrying out a fist embodiment of the magnetic core manufacturing method according to the invention. A reference numeral 1 denotes a hoop or band material made of silicon steel such as permalloy or amorphous and having the thickness smaller than 0.1 mm. The hoop material 1 is successively fed between an upper mold 3 having a punch 2 secured thereto and a lower mold 5 having a die 4 in which a hole 6 is formed. In the hole 6 is arranged a squeeze ring 7 for holding core sheets 1a punched out of the hoop material 1 by means of the cooperation of the punch 2 and die 4. That is to say, the squeeze ring 7 can support the core sheets 1a in a plane parallel with the horizontal plane by the frictional engagement there between. The punch 2 and die 4 are formed such that the core sheet 1a has a desired outer configuration. Within the lower mold 5 there is provided an optical fiber exit unit 8 in such a manner that an exit end is exposed to the inside space of the squeeze ring 7. The optical fiber exit unit 8 is optically coupled with a laser light source 9 by mean of an optical fiber L and the operation of the laser light source is controlled by a laser control device 11.

Figure 2:
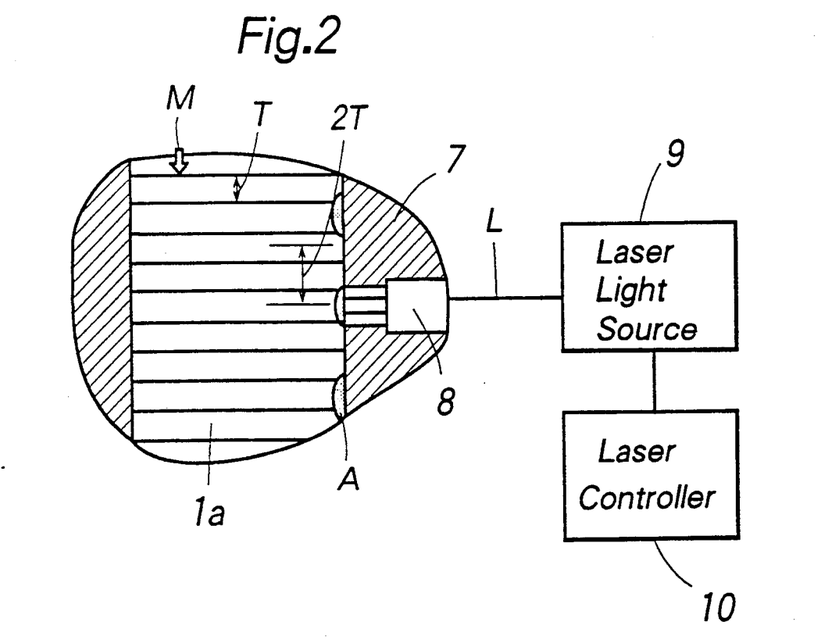
FIG. 2 is a cross section illustrating a part of the apparatus shown in FIG. 1 on an enlarged scale.
Figure 3:
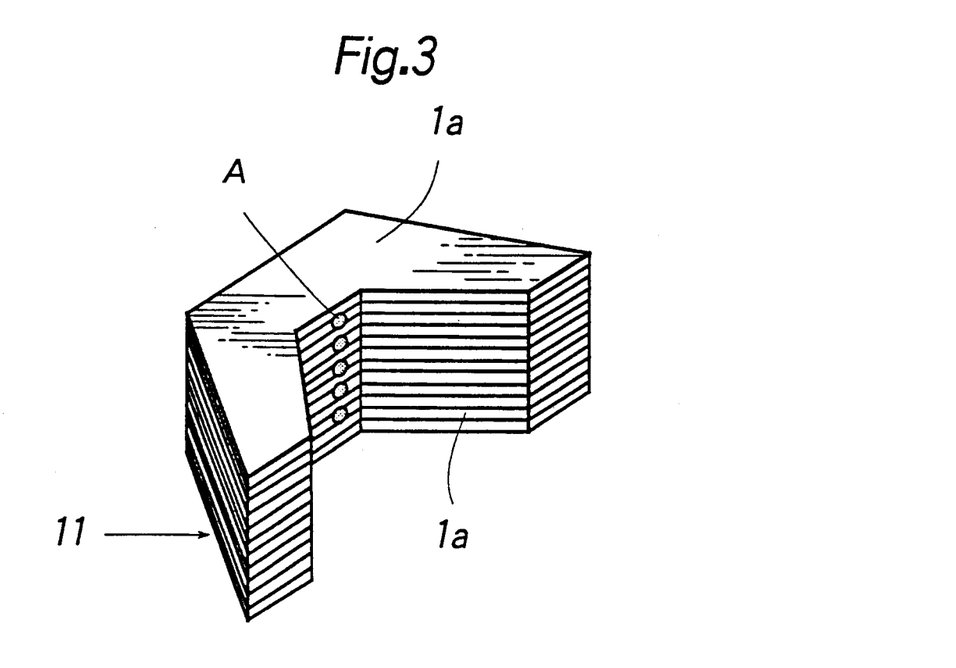
FIG. 3 is a perspective view depicting the magnetic core manufactured by the first embodiment of the method according to the invention.

Now the manner of welding the core sheets will be explained also with reference to a cross sectional view illustrated in FIG. 2. Core sheets 1a punched out of the hoop material 1 by means of the punch 2 and die 4 are inserted into the squeeze ring 7 one by one. Since the side edges of the core sheets 1a are brought into contact intimately with the inner wall of the squeeze ring 7, they do not descend and are stacked one on another to form a stacked body of core sheets within the squeeze ring. Each time the upper mold 3 having the punch 2 secured thereto is operated to form a core sheet 1a, the stacked body of core sheets is moved downward as shown by an arrow M within the squeeze ring 7 over a distance equal to the thickness T of the core sheets. In the present embodiment, every other times the upper mold 3 is operated, the laser light source 9 is energized to emit a laser beam which is transmitted through the optical fiber L and optical exit unit 8 and is made incident upon an outer surface of the stacked body of core sheets. Therefore, every time the stacked body of core sheets is moved downward over a distance substantially equal to a twice of the thickness of the core sheets (2T), the laser beam is projected onto the outer surface of the stacked body of core sheets. Then successive three core sheets 1a are simultaneously welded together and a distance between successive welded areas B amounts to substantially the thickness of the core sheets T. By repeating the above operation by desired times it possible to obtain a magnetic core 11 shown in FIG. 3, in which a predetermined number of core sheets 1a are stacked and coupled with each other by means of the discrete welded areas A.

In the present embodiment, the laser light source 9 is controlled by the laser control device 10 in synchronism with the operation of the upper mold 3 such that during the formation of a single magnetic core, the laser beam is emitted every other times the upper mold 3 is move reciprocally, but after a single magnetic core is formed, the operation of the laser light source 9 is interrupted until a next stacked body of core sheets is moved downward into a predetermined position, because the squeeze ring 7 has such a length that it can hold core sheets a number of which is larger than a predetermined number of core sheets forming a single magnetic core.

Figure 4:
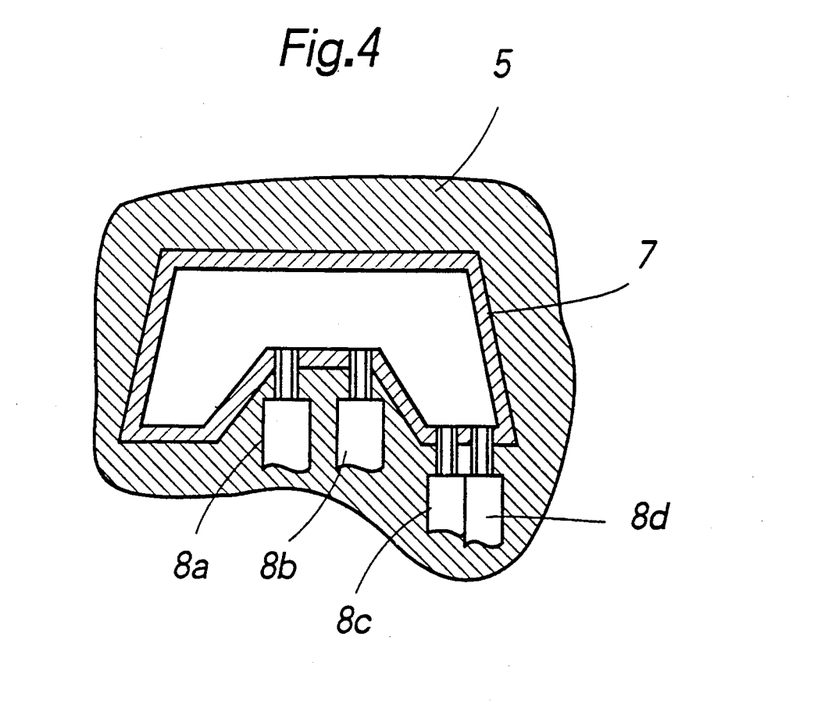
FIG. 4 is lateral cross section representing the apparatus for carrying out a second embodiment of the method according to the invention.
Figure 5:
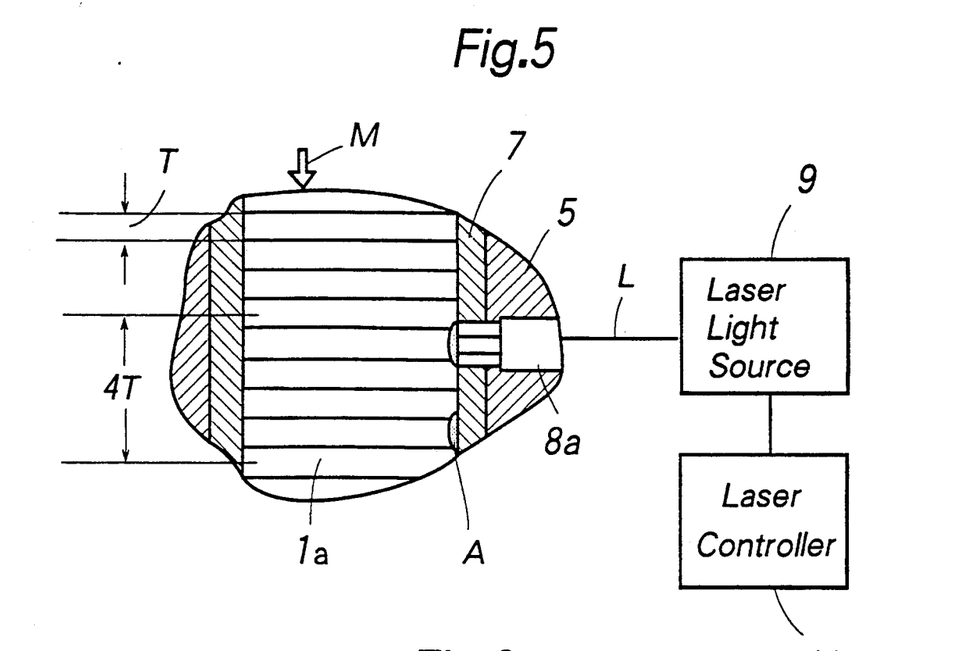
FIG. 5 is a longitudinal cross section of an apparatus shown in FIG. 4.

FIGS. 4 and 5 are lateral and longitudinal cross sections showing an apparatus for carrying out a second embodiment of the method according to the present invention. In this embodiment, first to fourth optical fiber exit units 8a to 8d are provided in the lower mold 5 and squeeze ring 7 such that exits ends of the first and second optical fiber exit units 8a and 8b situate at opposite ends of a middle straight side and exit ends of the third and fourth optical fiber exit units 8c and 8d are exposed at opposite ends of one of end straight sides. As illustrated in FIG. 5 the optical fiber exit units 8a to 8d are optically coupled with a laser light source 9 by means of optical fibers L, and the laser light source is controlled by a laser control device 10.

Figure 6:
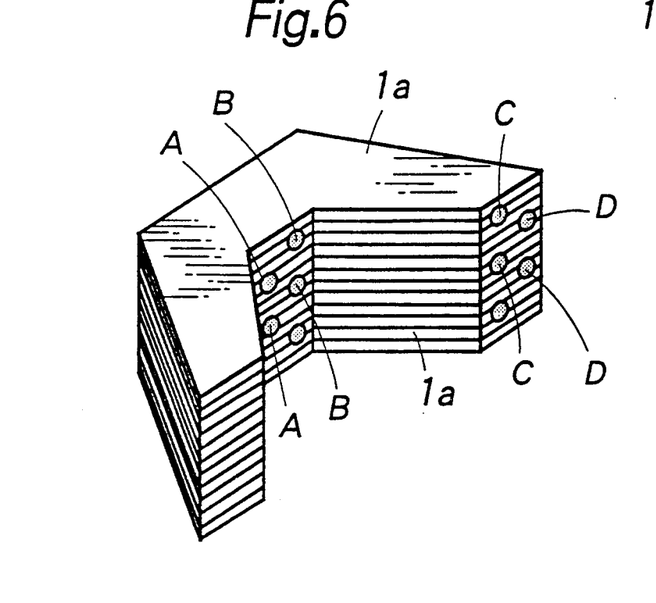
FIG. 6 is a perspective view illustrating the magnetic core manufactured by the second embodiment of the method according to the invention.

In the present embodiment, the laser light source 9 is controlled by the laser control device 10 in such a manner that each time the stacked body of core sheets 1a is moved downward over a distance equal to a twice of the thickness of the core sheets 2T, the laser beams are emitted alternatively from the second and third optical fiber exit units 8b and 8c and the first and fourth optical fiber exit units 8a and 8d. That is to say, at first the laser beams are simultaneously emitted from the second and third optical fiber exit units 8b and 8c to form welded areas B and C as shown in FIG. 6, then the stacked body of core sheets is moved downward over a distance substantially equal to a twice of the thickness of core sheets 2T, and after that the laser beams are simultaneously emitted from the first and fourth optical fiber exit units 8a and 8d to form welded areas A and D. Therefore, as illustrated in FIG. 5, successive welded areas A formed by the laser beams emitted from the same optical fiber exit unit 8a are separated in the thickness direction by a distance substantially equal to four times the thickness of core sheets 4T, so that the successive welded areas are hardly contacted with each other. Further, as depicted in FIG. 6, the welded areas A and B are separated from each other in a surface direction perpendicular to the thickness direction, and similarly the welded areas C and D are also sufficiently separated from each other in the surface direction.

Figure 7:
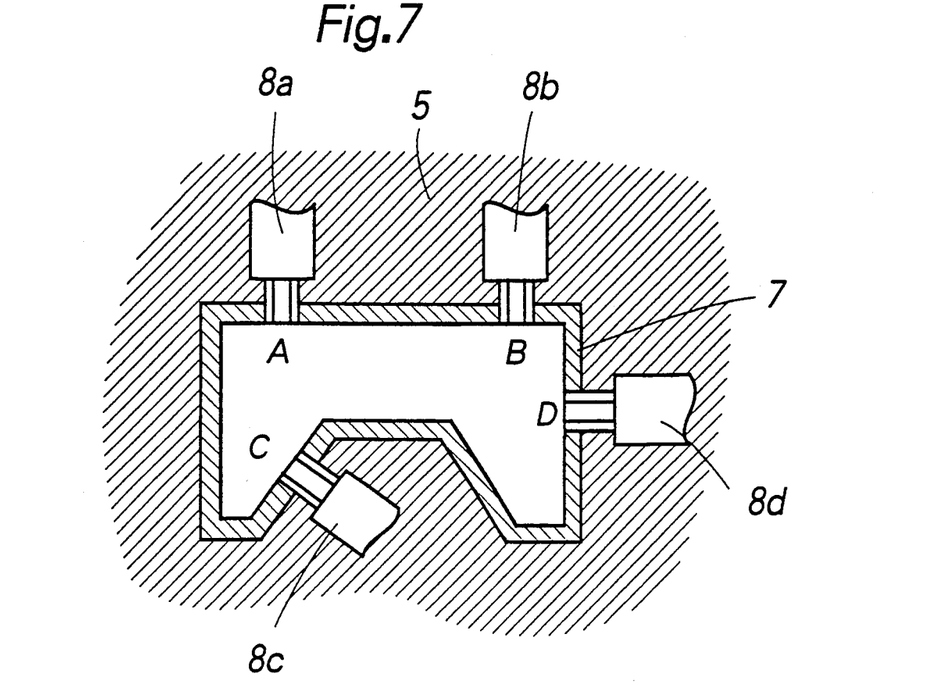
FIG. 7 is a lateral cross section showing an apparatus for carrying out a third embodiment of the method according to the invention.
Figure 8:
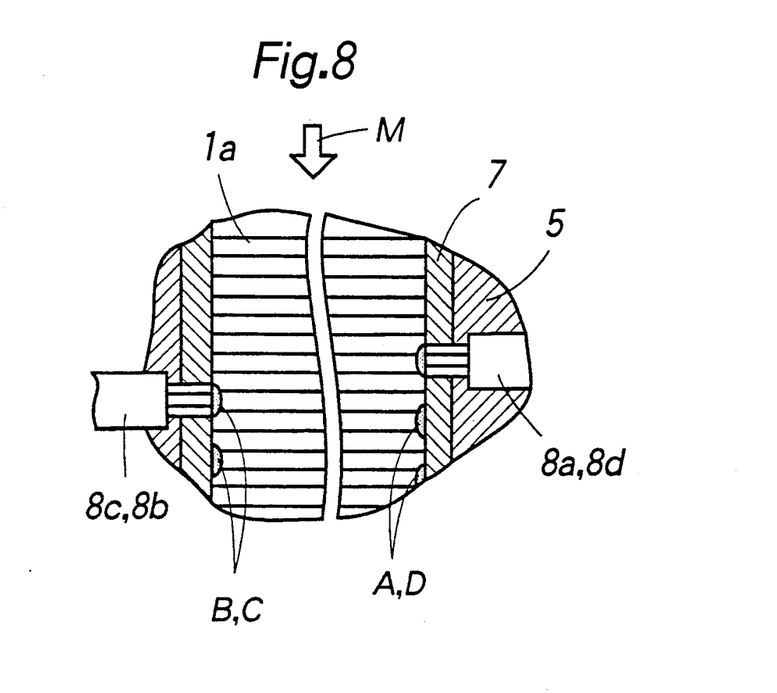
FIG. 8 is a longitudinal cross section of the apparatus depicted in FIG. 7.

FIGS. 7 and 8 are lateral and longitudinal cross sections, respectively illustrating an apparatus for performing a third embodiment of the method according to the instant invention. In this embodiment, first to fourth optical fiber exit units 8a to 8d are arranged in lower mold 5 and squeeze ring 7 as shown in FIG. 7. That is to say, the first and second optical fiber exit units 8a and 8b are arranged to expose at opposite ends of a major straight side, the third optical fiber exit unit 8c is arranged on an inclined side, and the fourth optical fiber exit unit 8d is provided to be exposed on a minor straight side. The first and fourth optical fiber exit units 8a and 8d are arranged in the same plane viewed in the thickness direction and the second and third optical fiber exit units 8b and 8c are also arranged in the same plane which is shifted in the thickness direction by a distance substantially equal to the thickness of core sheets.

Figure 9:
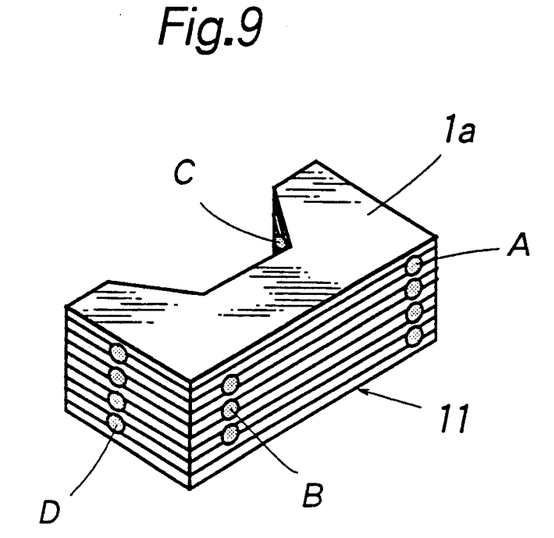
FIG. 9 is a perspective view illustrating the magnetic core manufactured by the second embodiment of the method according to the invention.

At first, the laser beams are simultaneously emitted from the first and fourth optical fiber exit units 8a and 8d to form welded areas A and D. Then, after the stacked body of core sheets has been moved downward over a distance substantially equal to the thickness of the core sheets 1a, the laser beams are simultaneously emitted from the second and third optical fiber exit units 8b and 8c to form welded areas B and C. After that, the stacked body of core sheets is further moved downward over a distance substantially equal to the thickness of core sheets T, and then the laser beams are simultaneously projected from the first and fourth optical fiber exit units 8a and 8d to from welded areas A and D. The above operation is repeated to form a laminated magnetic core shown in FIG. 9. As depicted in FIG. 8, in the present embodiment, successive welded areas A, B, C or D aligned in the thickness direction are separated in the thickness direction over a distance 2T substantially equal to a twice of the thickness of core sheets 1a.

Figure 10:
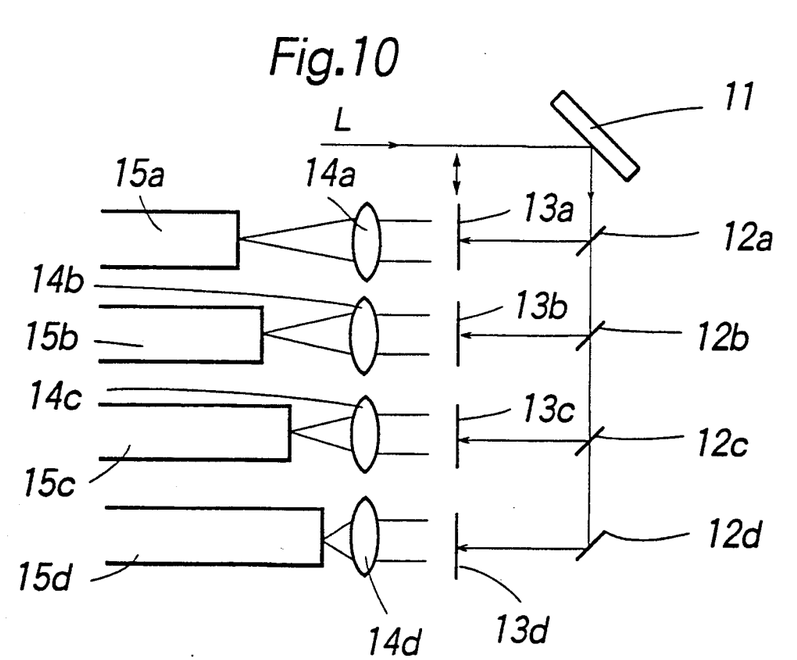
FIG. 10 is a schematic view depicting an embodiment of the laser light source.

FIG. 10 is a schematic view showing an embodiment of the laser light source for use in the present embodiment. A single laser beam L is reflected by a total reflection mirror 11 and is then transmitted through half mirrors 12a, 12b and 12c and a laser light beam transmitted through the half mirror 12c is reflected by a total reflection mirror 12d. Therefore, laser beams reflected by the half mirrors 12a, 12b and 12c and total reflection mirror 12d have the same light intensity which is equal to a quarter of that of the incident laser beam L. These laser beams are made incident upon optical fibers 15a to 15d, respectively by means of optical shutters 13a to 13d and lenses 14a to 14d, respectively. At first, the first and fourth shutters 13a and 13d are selectively opened so that the laser beams are simultaneously projected from the first and fourth optical fiber exit units 8a and 8d, and then after the stacked body of core sheets is moved downward over the distance substantially equal to the thickness of core sheets, the second and third shutters 13b and 13c are opened to emit the laser beams from the second and third optical fiber exit units 8b and 8c. The optical shutters 13a to 13d may be driven by means of solenoids.

In the embodiment shown in FIG. 10, the selective projection of the laser beams is performed by selectively operating the optical shutters, but the same effect can be attained by using a rotating or moving mirror. In this case, the intensity of the laser beam can be optimally utilized, because it is not necessary to divide the laser beam into a plurality of laser beams.

Figure 11:
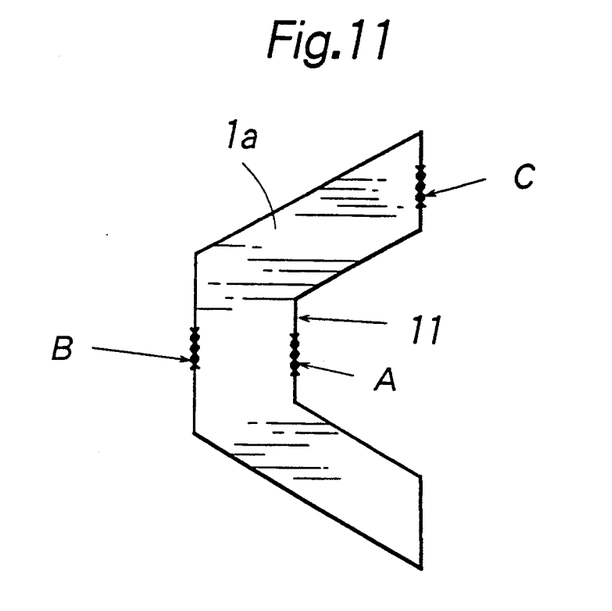
FIG. 11 is a plan view showing the magnetic core in which the welded areas are aligned along a plurality of lines.

The present invention is not limited to the embodiments so far explained, but many modifications and alternations may be conceived by those skilled in the art within the scope of the invention. For instance, in the first embodiment, the welded areas A are formed to be aligned in a single line in the thickness direction, but welded areas A, B and C may be formed to be aligned in the thickness direction along plural lines as shown in FIG. 11. In this case, it is possible to obtain a magnetic core similar to that depicted in FIG. 9. Further, in the above embodiments, the core sheets punched out of the hoop material by moving the upper mold are stacked within the lower mold and the stacked core sheets are welded by the laser beam, while the optical fiber exit units are fixedly secured to the lower mold, but the core sheets may be stacked without using the mold, and then the stacked body of core sheets may be moved with respect to the laser beam or the laser beam may be moved with respect to the stacked body of core sheets. Moreover, in the above embodiments, the magnetic core comprising the core sheets having the very thin core sheets is formed, but the method according to the present invention may be equally applied to the manufacture of an electric motor core which is composed of core sheets having the thickness smaller than 0.5 mm.

Figure 12:
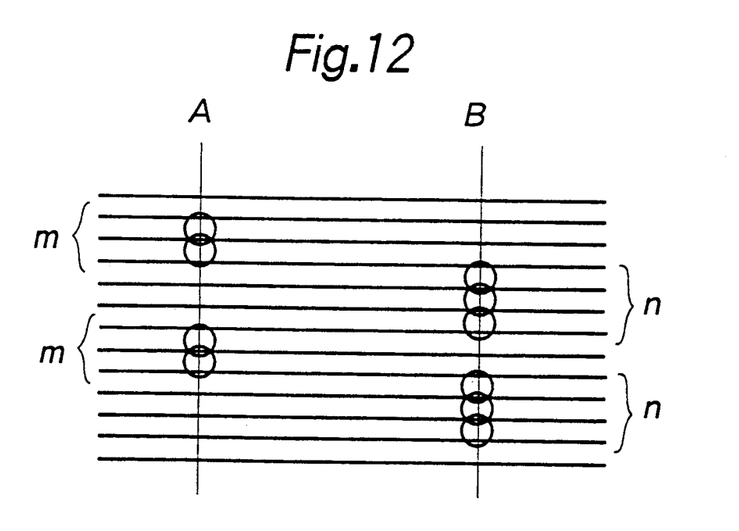
FIG. 12 is a schematic view illustrating another embodiment of the method according to the invention in which a plurality of core sheets are welded together by successively projecting the laser beam each time the stacked body of core sheets is moved in a stepwise manner over a distance equal to plural times of the thickness of core sheets.

In the third embodiment, each time the stacked body of core sheets is moved downward over the distance substantially equal to the thickness of core sheets, the welded areas A, D and B, C are alternately formed. In a modification of the third embodiment, as shown in FIG. 12, at first the welded areas A and D are formed by repeatedly projecting the laser beams by m times (in FIG. 12, m=2) while the stacked body of core sheets is moved in a stepwise manner over m core sheets, and then after the stacked body has been moved over a distance substantially equal to the thickness of core sheets, the laser beams are repeatedly projected by n times (in FIG. 12, n=3) to form the welded areas B and C while the stacked body of core sheets is moved downward in a stepwise manner over n thickness of core sheets.

Further in the above explained embodiments, successive three core sheets are welded together by means of a single projection of the laser beam, but according to the invention, more than three core sheets may be welded together at once by suitably setting the diameter of the laser beam spot on the stacked body of core sheets in relation to the thickness of the core sheets. Also in this case, successive welded areas are separated in the thickness direction and/or surface direction.

According to the present invention, the core sheets can be welded by intermittently projecting one or more laser beams such that successive welded areas are completely separated in the thickness direction and/or surface direction even if the thickness of core sheets is very small, so that the decrease in the magnetic resistance, hysteresis loss and iron loss can be effectively avoided and the magnetic efficiency of the magnetic circuit including the laminated magnetic core manufactured by the method according to the invention can be improved. Further, the number of laser projections can be reduced and it is not necessary to effect the positioning of the stacked body of core sheets and laser beam very precisely as compared with the known laser welding method, so that the manufacturing cost can be decreased and the working efficiency can be increased. Moreover, in the second embodiment in which successive welded areas are separated in the surface direction, the magnetic property of the laminated magnetic core can be further improved, because a distance between successive welded areas becomes very long.

What is claimed is:

1. A method of manufacturing a laminated core comprising the steps of: stacking a plurality of core sheets one on another to form a stacked body of core sheets; and projecting a laser beam onto an outer surface of the stacked body of core sheets intermittently each time the laser beam and the stacked body of core sheets are moved relative to each other in a thickness direction perpendicular to surfaces of the core sheets over a distance substantially equal to at least a twice of a thickness of core sheets such that at least two successive core sheets are welded with each other by a single projection of the laser beam.

2. A method according to claim 1, wherein the stacked body of core sheets is moved in the thickness direction with respect to the laser beam which is projected from a stationary point, and the laser beam is emitted each time the stacked body of core sheets is moved over a distance substantially equal to at least a twice of the thickness of core sheets.

3. A method according to claim 2, wherein the core sheets are successively produced by punching a hoop material by means of an upper mold having a punch secured thereto and a lower mold having a hole in which a squeeze ring is provided, the core sheets are successively inserted into the squeeze ring to form the stacked body of core sheets and at least one laser beam is projected from at least one optical fiber exit unit provided in the lower mold and squeeze ring, while the laser beam is projected from the optical fiber exit unit from a laser light source by means of at least one optical fiber and said laser light source is controlled by a laser control device such that the laser beam is intermittently projected onto the stacked body of core sheets in synchronism with the operation of the upper mold.

4. A method according to claim 3, wherein the laser beam is projected onto the stacked body of core sheets each time the stacked body of core sheets is moved in the thickness direction over a distance substantially equal to at least a twice of the thickness of core sheets.

5. A method according to claim 3, wherein at least two optical fiber exit units are provided such that their exit ends situate on the same level viewed in the thickness direction, but are separated from each other viewed in a surface direction perpendicular to the thickness direction, and at least two laser beams are emitted from the exit ends of said at least two optical fibers alternatively each time the stacked body of core sheets is moved in the thickness direction over a distance substantially equal to at least a twice of the thickness of the core sheets.

6. A method according to claim 5, wherein the laser beam is repeatedly projected from the exit end of one optical fiber exit unit each time the stacked body of core sheets is moved in the thickness direction in a stepwise manner over a distance substantially equal to at least twice of the thickness of core sheets, and then after the stacked body of core sheets is moved in the thickness direction over a distance substantially equal to at least a twice of the thickness of core sheets, the laser beam is repeatedly projected from the exit end of another optical fiber exit unit each time the stacked body of core sheets is moved in the thickness direction in a stepwise manner over a distance substantially equal to at least twice of the thickness of core sheets viewed in the thickness direction.

7. A method according to claim 5, wherein plural groups of optical fiber exit units are arranged such that exit ends of optical fiber exit units of each group situate on the same first plane viewed in the thickness direction, but are separated from each other viewed in the surface direction, and the planes on which the exit ends of the optical fiber exit units of different groups situate are shifted in the thickness direction by a distance substantially equal to the thickness of the core sheets, and after the laser beams have been simultaneously projected from the exit ends of optical fiber exit units of one group, the stacked body of core sheets is moved in the thickness direction over a distance equal to at least a twice of the thickness of the core sheets, and then the laser beams are simultaneously emitted from the exit ends of optical fiber exit units of another group.

8. A method according to claim 7, wherein the laser beams are repeatedly projected from the exit ends of optical fiber exit units of one group each time the stacked body of core sheets is moved in the thickness direction in a stepwise manner over a distance substantially equal to at least twice of the thickness of core sheets, and then after the stacked body of core sheets is moved in the thickness direction over a distance substantially equal to at least a twice of the thickness of core sheets, the laser beams are repeatedly projected from the exit ends of optical fiber exit units of another group each time the stacked body of core sheets is moved in the thickness direction in a stepwise manner over a distance substantially equal to at least twice of the thickness of core sheets viewed in the thickness direction.

* * * * *